United States Patent
Deal

(10) Patent No.: US 6,604,349 B2
(45) Date of Patent: Aug. 12, 2003

(54) LAWN OR EDGE TRIMMER SWIVEL WHEEL APPARATUS

(76) Inventor: Cliften Deal, 1379B Curtis Switch Rd., Mineral Bluff, GA (US) 30559

( * ) Notice: Subject to any disclaimer, the term of this patent is extended or adjusted under 35 U.S.C. 154(b) by 0 days.

(21) Appl. No.: 09/972,823

(22) Filed: Oct. 5, 2001

(65) Prior Publication Data

US 2003/0066279 A1 Apr. 10, 2003

(51) Int. Cl.[7] .............................................. A01D 34/00
(52) U.S. Cl. ...................................................... 56/12.7
(58) Field of Search ................................ 56/12.1, 12.7, 56/16.7, 17.5, 17.2; 172/15, 14, 13, 17; 280/47.17, 47.2, 47.24; 30/276

(56) References Cited

U.S. PATENT DOCUMENTS

| | | | | |
|---|---|---|---|---|
| 5,095,687 A | * | 3/1992 | Andrew et al. .............. | 56/12.7 |
| 5,317,807 A | * | 6/1994 | Pulley ........................ | 30/296.1 |
| 5,970,694 A | * | 10/1999 | Knox, Jr. ..................... | 56/16.7 |
| 6,085,503 A | * | 7/2000 | Hutchinson ................. | 56/12.7 |
| 6,263,975 B1 | | 7/2001 | Rosa et al. .................... | 172/15 |
| 6,363,699 B1 | * | 4/2002 | Wang ......................... | 56/12.7 |

* cited by examiner

Primary Examiner—Robert E. Pezzuto
(74) Attorney, Agent, or Firm—Clifford Kraft

(57) ABSTRACT

An apparatus and method that allows a conventional trimmer of the type with flying cutting string or any other type blade to maintain a controllable height above the cutting plane and to swivel 360 degrees. The apparatus includes a set of wheels that also acts as a fulcrum point forming a lever with the heavier head of the trimmer closer to the wheels and the handle acting as a long lever arm. The apparatus allows the operator to trim around curbs and edges without making contact. This conserves string and is safer. The apparatus converts and standard trimmer into a mini-lawnmower allowing less stain on the operator.

14 Claims, 5 Drawing Sheets

LAWN OR EDGE TRIMMER SWIVEL WHEEL APPARATUS

BACKGROUND

1. Field of the Invention

This invention is concerned with the field of edge trimmers and more particularly with a swivel wheel device attached to a trimmer to allow 360 degree swiveling.

2. Description of Prior Art

The prior art contains references to edgers that are equipped with wheels; however, an edger is totally different than a trimmer. As taught in U.S. Pat. No. 6,263,975, an edger has a rotating blade for edging around cement. A trimmer is a device also sometimes called a weed eater. A trimmer generally has a rotating flying cutting string or strings (which may be fish line or other strong string-like material). The rotating string slices weeds and grass to perform the edging or weeding function.

A great disadvantage of the flying string trimmer is that it is hard to keep it at a certain fixed level above the desired cutting surface. Another disadvantage is that because the height is hard to control, the string wears out faster because the unit cuts deeper and digs rocks, etc.

What is badly needed is a removable device for a trimmer that maintains a controllable height and allows the trimmer to swivel 360 degrees and forms a fulcrum for a lever arm so that the trimmer can be raised or lowered toward the target cutting surface.

SUMMARY OF THE INVENTION

The present invention presents an apparatus and method that allows a conventional trimmer of the type with flying cutting string to maintain a controllable height above the cutting plane and to swivel 360 degrees. The present invention includes a set of wheels that also acts as a fulcrum point forming a lever with the heavier head of the trimmer closer to the wheels and the handle acting as a long lever arm. The tool also can be rotated backward with the cutting end up for service with the entire system in a stable resting position.

The present invention allows an operator to trim around curbs and edges without making contact. It conserves string and is safer because it picks up less trash and rocks. The present invention also leads to smoother cutting because the cutting plane is accurately defined and can be controlled. The present invention converts any standard trimmer into a mini-lawnmower allowing less strain on the operator in using it (it is held off the cutting plane or ground by the wheels rather than the operator). The present invention allows a standard trimmer to be used without a shoulder strap if desired (a shoulder strap can of course be used if desired).

The present invention consists of a set of swivel wheels (at least two wheels) attached to the long handle of a standard trimmer (while more than two wheels could be used, the preferred method is to use two wheels). The wheels are castered so that they can rotate 360 degrees.

The preferred means of attaching the wheels to the trimmer handle is through a series of two clamps (although one clamp is within the scope of the present invention, it does not result in as stable a system as that with two or more clamps). The preferred size of the wheels is around one inch thick and about four inches in diameter; however, it should be realized by those skilled in the art that many other sizes of wheels could be used with equal success. The preferred distance between the wheels is about 22 inches; however, many other distances are possible. If the distance between the wheels is too small, the device becomes unstable and could fall over sideways. If the distance is too large, the device becomes cumbersome to use and will not turn on a tight radius.

The preferred configuration consists of a lower clamp and an upper clamp on the long tubular handle of the trimmer. The two clamps can be separated from one another from 6 to over 20 inches with about equal results. The wheels can be attached to the lower clamp through two strut-like structures (which can be aluminum tubing or other rigid material) forming a V or U shape with the wider legs of the V or U at the bottom. To give the structure fore and aft support, a pair of support tubes can extend downward to the wheels from the upper clamp. The lower struts can form an arc as well as a V (or any other convenient and strong configuration).

The preferred height for the lower clamp to the ground is about 12 inches although many other heights are within the scope of the present invention. The key idea is to create a lever out of the trimmer with the fulcrum point at the lower clamp. The entire system can that be levered fore and aft to define a cutting height. As stated, the system can also be levered completely backward (so the motor drive is on the ground) to raise the cutting head upward for service or string replacement.

It is also possible to mount an optional handle-bar structure on a third clamp above the other two to make it easier to steer and control the apparatus. The entire apparatus thus can be put into two rest positions with the trimmer motor off. If the apparatus is allowed to lever forward, the cutter head will touch the ground and support the apparatus in an upright position. If the apparatus is tilted backward, because of the weight of the motor on the top end, it will sit in a stable rest position with the motor on the ground and the cutting head sticking approximately straight out as stated, this position is very convenient to service the head including the installation of a new string.

It should be noted that the above described illustrations are for the purpose of explaining the concepts of the invention. Many other forms and embodiments are within the scope of the invention.

DETAILED DESCRIPTION OF THE INVENTION

Figure 1:
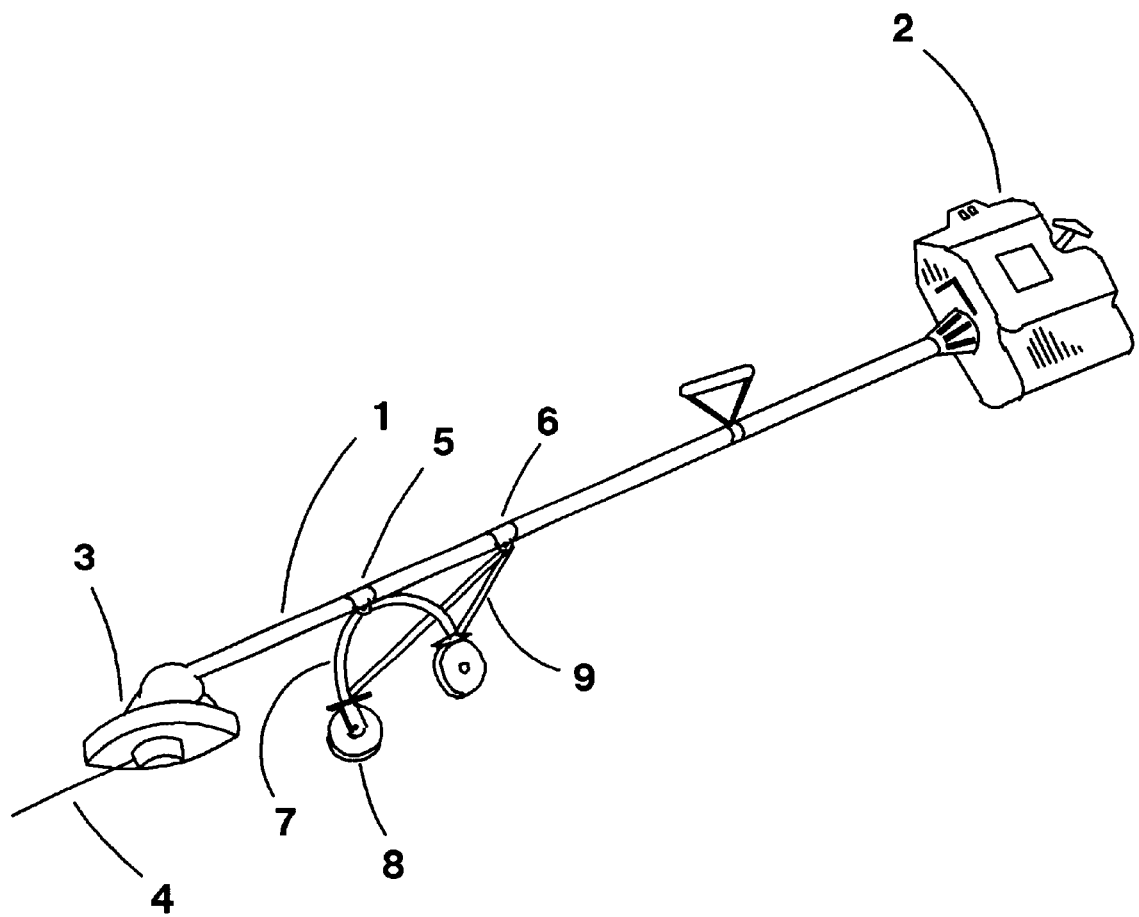
FIG. 1 shows a profile view of an embodiment of the present invention attached to the tubular handle of a trimmer.

Turning to FIG. 1, a profile view of an embodiment of the present invention is seen. A standard trimmer is shown with a tubular handle 1. A motor drive 2 is shown on one end and a cutter head 3 with flying string 4 is shown on the other end. A lower clamp 5 and an upper clamp 6 is also shown. Attached to the lower clamp 5 is a set of caster wheels 8. These wheels are free to rotate 360 degrees. From the upper clamp 6 a set of secondary support struts 9 are shown. These are attached to the fixed part of the caster wheels 8 and provide fore and aft stability.

Figure 2:
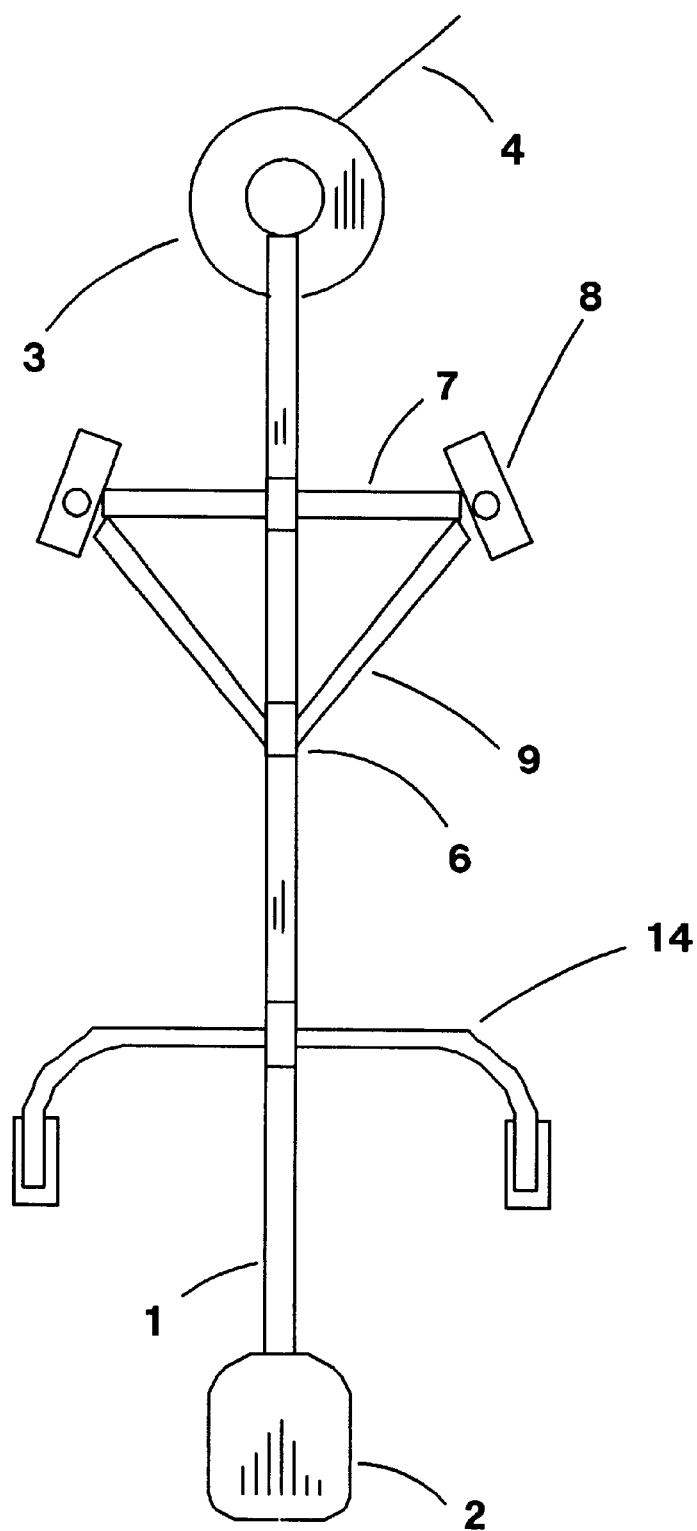
FIG. 2 shows a top view of an embodiment of the present invention with handle bars.

FIG. 2 shows a top view of an embodiment of the present invention equipped with handle bars 14. Handle bars are optional; however, they make it possible to more easily control the system and make it easier for the operator. Again the trimmer handle 1, the drive motor 2 and the cutter head 3 are clearly seen. Also seen are the wheels 8 and struts \7, 9.

Figure 3:
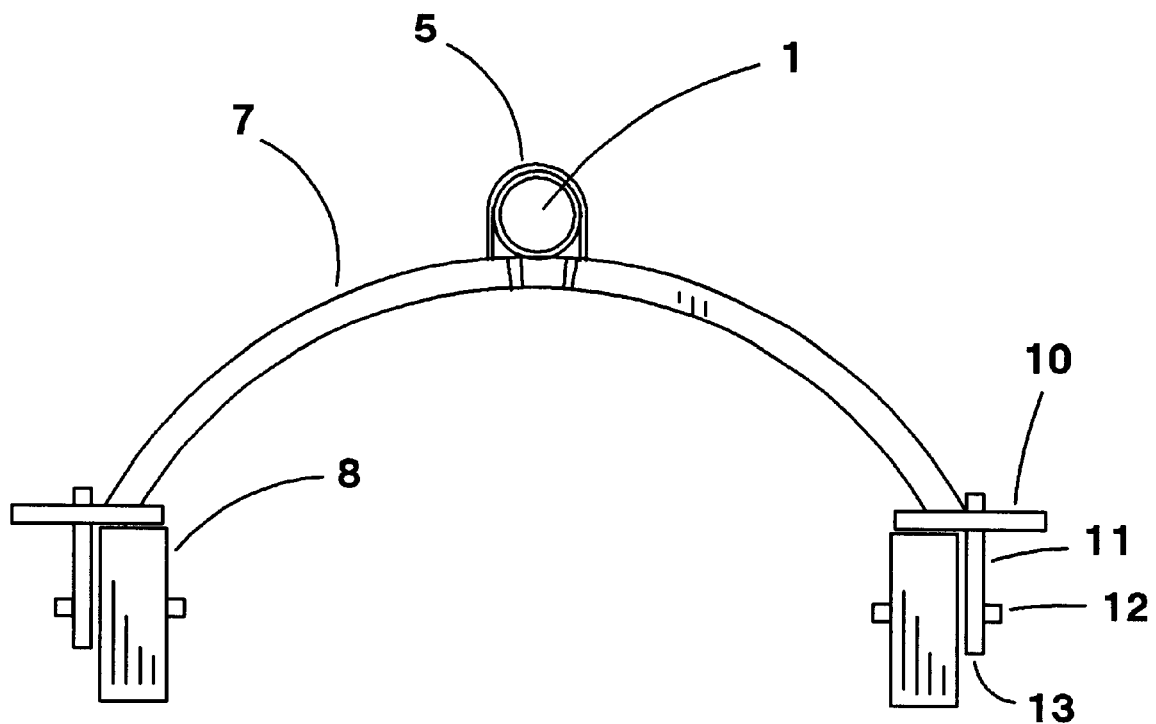
FIG. 3 shows a front view of the lower clamp, strut, and wheels.

FIG. 3 shows a view of the embodiment of FIG. 1 looking fore and aft. A U-shaped strut 7 can be seen extending from the lower clamp 5 around the tubular handle 1 downward to the caster wheels 8. Each caster wheel 8 has a axal 12 and is free to rotate 360 degrees on a caster mechanism 11. Each caster wheel has a fixed top or head 10 to which the struts 7 are attached. While a U-shaped strut is shown in FIG. 3, it should be understood that this shape is not critical to the functioning of the present invention. Any shape that provides a strong support could be used including, but not limited to, a V-shape.

Figure 4:
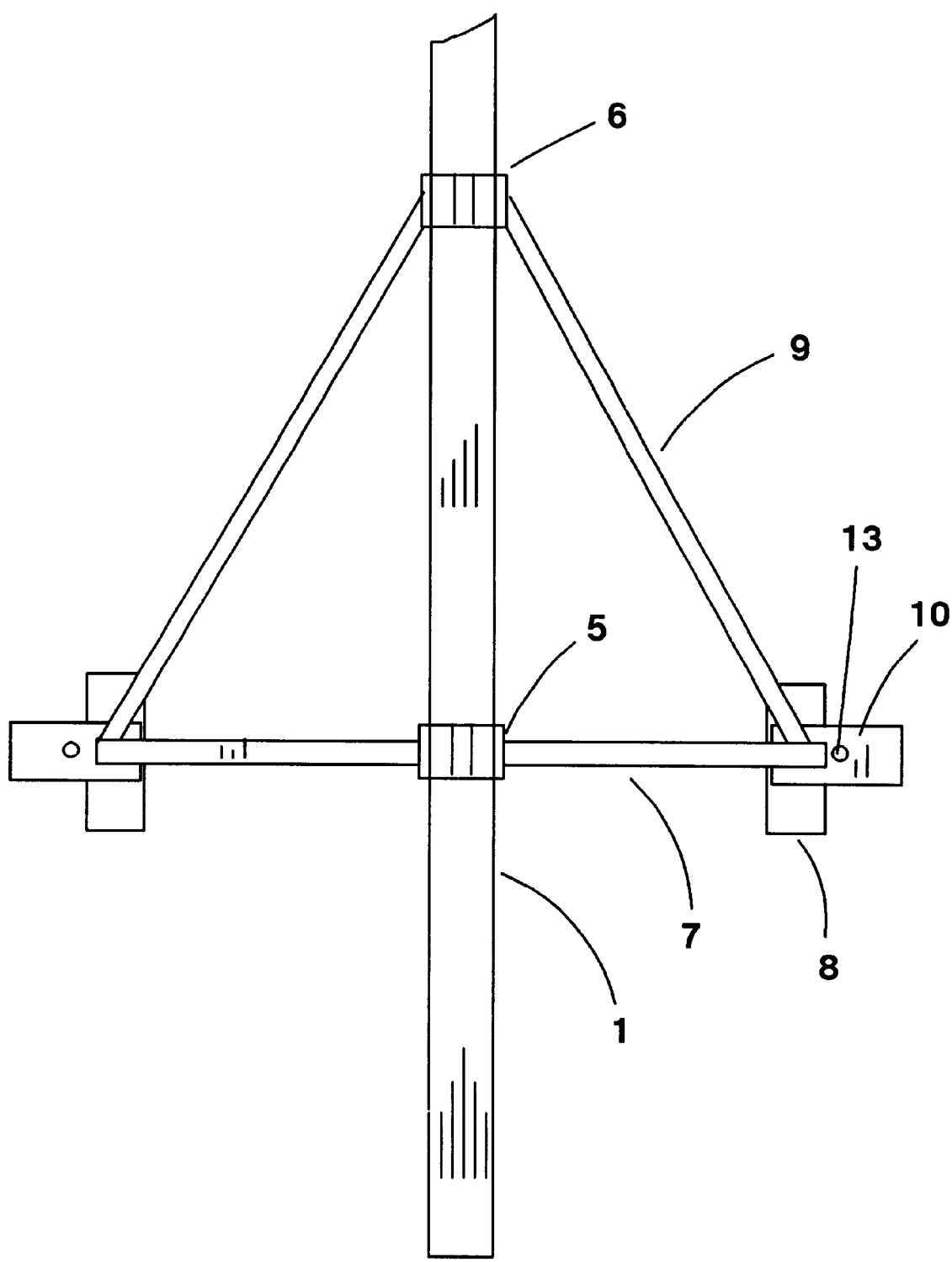
FIG. 4 shows a top view of the embodiment of FIG. 2.

FIG. 4 shows a top view of the embodiment of FIG. 3. The tubular handle 1 is seen as well as the upper 6 and lower clamp 5. The U-shaped support strut 7 extends from the lower clamp 5 to the fixed part 10 of the caster wheel. The caster rod or mechanism 13 can be also seen in FIG. 4. From the upper clamp 6, a pair of secondary support struts 9 can be seen also extending downward to the fixed part 10 of the caster wheels. These secondary struts 9 provide additional fore and aft support for the structure. While it is possible to construct an embodiment of the present invention without these secondary struts 9, the preferred method is to use them for strength and stability. The preferred material for the struts is aluminum tubing for strength and lightness; however, any strong material can be used and is within the scope of the present invention including, but not limited to, steel tubing. All of the struts could be bars or rods as well as tubing. Tubing is preferred because of its strength and lightness compared to a strut of solid cross—section.

The preferred size of the wheels 8 is around 1 inch thick and several inches in diameter. The caster mechanism should provide a smooth swivel of 360 degrees. An ideal clamp size is around ¾ inch or other size depending on the diameter and cross-section of the trimmer handle. The preferred distance between the wheels is around 22 inches to provide a stable structure with a tight swivel radius. In the cutting position, the height of the lower clamp from the base of the cutting head should be around 12 inches. The preferred distance of the upper clamp from the wheels is around 18 inches. It should be noted that these distances and measures are for illustration only of one possible embodiment of the present invention. Many other dimensions, measures, and distances are possible and within the scope of the present invention.

It should be noted that the present invention removes the need for a shoulder strap on the trimmer. Of course the use of a strap is optional if desired.

Figure 5:
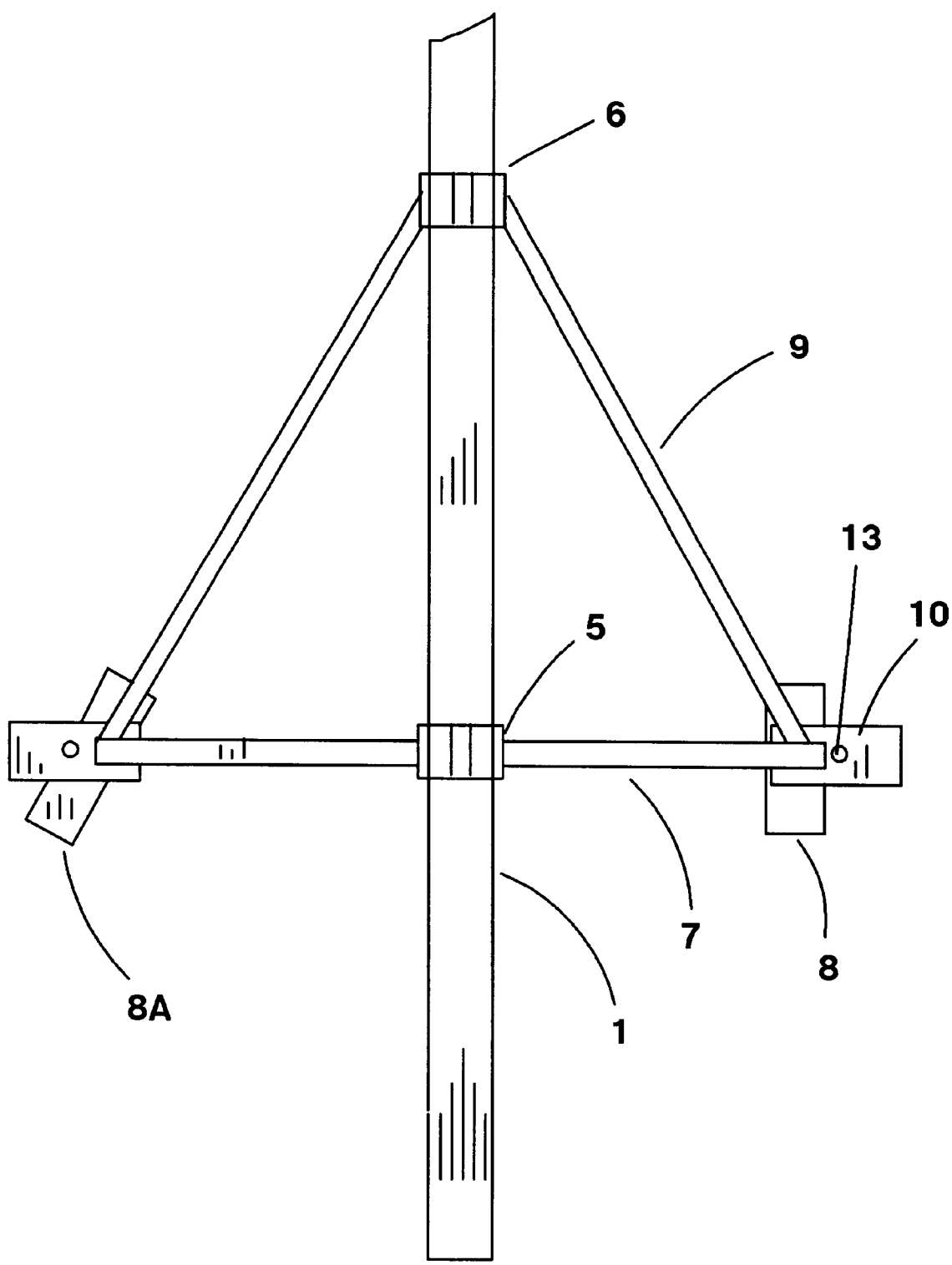
FIG. 5 is the same as FIG. 3 except that one of the wheels is shown in the castered or turned position.

FIG. 5 is the same as FIG. 3 except that one of the caster wheels 8A is turned to show the that it can take any angle from 0 to 360 degrees.

It should be understood that the embodiments described and illustrated herein are for purposes of explanation of the invention. It will be understood by those skilled in the art that many other embodiments, forms, designs, and deviations are within the scope of the invention.

I claim:

1. A lawn or weed trimmer attachment comprising, in combination:

a trimmer with a trimmer handle shaft, said trimmer handle shaft having a lower section and an upper section;

exactly two separated caster wheels attached to the lower section of said trimmer handle shaft by a U-shaped strut, said U-shaped strut making contact with said trimmer handle shaft at a first point;

exactly two straight struts attached to a second point on said trimmer handle shaft, said second point being above said first point on said shaft, each of said straight struts attached to one of said caster wheels;

said caster wheels allowing said trimmer to swivel 360 degrees.

2. The lawn or weed trimmer of claim 1 wherein said U-shaped strut is made from aluminum tubing.

3. The lawn or weed trimmer of claim 1 wherein said straight struts are made from aluminum tubing.

4. The lawn or weed trimmer of claim 1 wherein said struts are attached to said trimmer handle shaft with a clamp.

5. The lawn or weed trimmer of claim 4 wherein said clamp is around 12 inches above said caster wheels.

6. The lawn or weed trimmer of claim 1 wherein said caster wheels are around 22 inches apart.

7. The lawn or weed trimmer of claim 1 further comprising a handle bar located on said upper section of trimmer handle shaft.

8. A universal attachment for a lawn or weed trimmer of the type with an elongated handle with a drive motor on one end and a flying string head on a second end, the attachment converting the trimmer into a mini-lawnmower, the attachment comprising exactly two swivel caster wheels located near the flying string head, the swivel caster wheels on the ground acting as a lever fulcrum allowing the trimmer to be tilted back thus establishing a controllable cutting plane above the ground, the trimmer being able to be thus swiveled 360 degrees, the swivel caster wheels being attached to the elongated handle by a U-shaped strut supported by exactly two straight struts.

9. The universal attachment of claim 8 wherein each of said two straight struts attach to one of said swivel caster wheels.

10. An edge trimmer support system comprising:

a support structure having exactly two caster wheels, said caster wheels each rotating 360 degrees;

a securing means with a first and second end and a center attached to each of said caster wheels for removabley engaging a trimmer shaft of a trimmer;

said securing means having said first end attached to a first of said caster wheels and said second end attached to a second of said caster wheels, the center of said securing means being removeably coupled to said trimmer shaft with a first bracket.

11. The edge trimmer support system of claim 10 further comprising exactly two support shafts, each of said support shafts attached to a caster wheel, both of said support shafts removeably coupled to said trimmer shaft with a second bracket.

12. The edge trimmer support system of claim 11 wherein said second bracket is higher on said trimmer shaft than said first bracket.

13. The edge trimmer support system of claim 10 wherein said securing means is aluminum tubing.

14. The edge trimmer support system of claim 11 wherein said support shafts are aluminum tubing.

* * * * *